Patented Dec. 1, 1931

1,834,845

UNITED STATES PATENT OFFICE

RUPERT SYDNEY JONES, OF FLINT, AND STANLEY PEARSON, OF COVENTRY, ENGLAND, ASSIGNORS TO COURTAULDS LIMITED, OF LONDON, ENGLAND, A BRITISH COMPANY

TREATMENT OF WASTE LIQUORS

No Drawing. Application filed July 15, 1930, Serial No. 468,199, and in Great Britain September 23, 1929.

This invention relates to the treatment of waste liquors and in particular to waste liquors containing alkaline sulphide, including in this term both mono- and poly-sulphide. Such waste liquors cannot be discharged directly into streams or small rivers on account of the toxic action of the alkaline sulphides, and therefore it becomes necessary first to remove such alkaline sulphides. A method hitherto employed for this purpose has consisted in treating the effluent liquors with ferrous sulphate and milk of lime in order to precipitate the sulphides in the form of ferrous sulphide, and then to allow the ferrous sulphide so obtained to settle together with the lime, whereupon the clear liquid, free from the dissolved sulphide can, with or without any such further treatment as may be considered desirable, be passed into the stream or river.

We have now found that waste liquors containing alkaline sulphide as aforesaid, can be treated otherwise than hereinbefore described, whereby certain advantages are obtained. According to this invention, the waste liquors containing alkaline sulphide are treated with acid until they are neutral or very slightly acid in the presence of a body containing the sulphur dioxide radical. They are then thoroughly mixed and then treated, in the presence of a zinc or magnesium compound, with caustic alkali until the whole liquor is alkaline, and preferably alkaline to phenol phthalein.

If the waste liquors already contain a body containing the sulphur dioxide radical in sufficient quantity, it will be unnecessary to add a further quantity of such body. In case, however, there is an insufficient amount of such body present, so that after adding the acid there is not enough sulphur dioxide to combine with the whole of the sulphuretted hydrogen liberated, it will be necessary to add a body containing the sulphur dioxide radical. As examples of bodies containing the sulphur dioxide radical we may mention a sulphite, such as sodium sulphite and sodium bisulphite, or sulphur dioxide itself can be employed. The sulphur dioxide may for example be blown into the liquor in the form of gas, or the sulphur dioxide can be made to react with the liquor in a tower. It is preferred that the body containing the sulphur dioxide radical be present in the waste liquors before the acid be added or that it be added simultaneously with the acid. In some cases however, the benefits of this invention can be obtained by adding the body containing the sulphur dioxide radical soon after the addition of the acid to the waste liquors.

As examples of zinc or magnesium compounds which can be used according to this invention, we may mention salts such as zinc sulphate but other compounds such as magnesium oxide and magnesium hydroxide can also be employed. The zinc or magnesium compound and the caustic alkali can be added to the waste liquor simultaneously, or they may even be added together in the form of sodium zincate; it is generally preferred however, to add the zinc or magnesium compound earlier in the process, for example simultaneously with the body containing the sulphur dioxide radical since an efficient mixing is thereby promoted.

A convenient method of carrying out the process according to this invention consists in adding to the waste liquor as it is running along a channel a solution of zinc sulphate and a solution of sodium bisulphite and sufficient sulphuric acid to render the whole acid. The liquors are then passed through a tank whereby they become thoroughly mixed, whereupon a portion of the precipitated sulphur will settle out; caustic alkali is then added until the whole liquor is alkaline, and preferably alkaline to phenol phthalein. The alkaline liquor is then passed through precipitating tanks, whereupon the precipitated zinc hydrate and the remainder of the sulphur settle out very effectively, leaving a clear effluent liquor free from the dissolved sulphide.

The sulphur which settles from the liquor during this process can advantageously be used as a source of the sulphur dioxide radical which is used in treating further waste liquors. The zinc or magnesium compound used may be defined as a compound of a metal of the magnesium group with an atomic weight between 20 and 70.

What we claim is:—

1. The treatment of waste liquors containing alkaline sulphide which consists in first treating the said liquors with acid in the presence of a body containing the sulphur dioxide radical, and then with caustic alkali, in the presence of a compound of the magnesium group with an atomic weight between 20 and 70 until the whole liquor is alkaline, substantially as described.

2. The treatment of waste liquors containing alkaline sulphide which consists in treating the said liquors with acid until they are neutral or very slightly acid, and adding a compound of the magnesium group with an atomic weight between 20 and 70 and a body containing the sulphur dioxide radical, then passing the liquors through a tank and allowing a part of the sulphur to settle out, then adding caustic alkali until the whole liquor is alkaline and then passing the alkaline liquors through further precipitating tanks.

In testimony whereof we have signed our names to this specification.

RUPERT SYDNEY JONES.
STANLEY PEARSON.